US009387466B2

(12) United States Patent
Rana et al.

(10) Patent No.: US 9,387,466 B2
(45) Date of Patent: Jul. 12, 2016

(54) MILD ACIDIC CATALYST FOR HYDROPROCESSING OF HEAVY CRUDE OIL AND RESIDUE AND ITS SYNTHESIS PROCEDURE

(75) Inventors: Mohan Singh Rana, Mexico City (MX); Jorge Ancheyta Juarez, Mexico City (MX); Zenaida Carolina Leyva Inzunza, Mexico City (MX); Samir Kumar Maity, Mexico City (MX); Léon Pablo Torres Mancera, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 502 days.

(21) Appl. No.: 12/991,557

(22) PCT Filed: Nov. 27, 2008

(86) PCT No.: PCT/MX2008/000162
§ 371 (c)(1),
(2), (4) Date: Dec. 16, 2010

(87) PCT Pub. No.: WO2009/136779
PCT Pub. Date: Nov. 12, 2009

(65) Prior Publication Data
US 2011/0100875 A1 May 5, 2011

(30) Foreign Application Priority Data
May 9, 2008 (MX) .................. MX/a/2008/006050

(51) Int. Cl.
C10G 47/20 (2006.01)
B01J 29/16 (2006.01)
(Continued)

(52) U.S. Cl.
CPC ............... *B01J 29/166* (2013.01); *B01J 21/12* (2013.01); *B01J 23/85* (2013.01); *B01J 23/882* (2013.01);
(Continued)

(58) Field of Classification Search
CPC .... B01J 29/166; B01J 37/0205; B01J 35/023; B01J 23/883; B01J 23/882; B01J 35/108; B01J 35/1019; B01J 35/1061; B01J 23/888; B01J 21/12; B01J 37/031; B01J 37/0207; C10G 47/20; C10G 47/16
USPC .................................. 208/111.3; 502/255, 66
See application file for complete search history.

(56) References Cited

U.S. PATENT DOCUMENTS 3,130,007 A 4/1964 Breck
3,423,332 A 1/1969 Maher et al.
(Continued)

FOREIGN PATENT DOCUMENTS

EP 0162733 11/1985
GB 2114594 8/1983
MX PA/A/2005/012893 * 11/2005

OTHER PUBLICATIONS

Rana et al., Heavy crude oil hydroprocessing: A zeolite-based CoMo catalyst and its spent catalyst characterization, Catalysis Today, 130 (2008) 411-420.
(Continued)

*Primary Examiner* — Randy Boyer
*Assistant Examiner* — Juan Valencia
(74) *Attorney, Agent, or Firm* — Dickinson Wright PLLC (57) ABSTRACT

This invention reveals a method for synthesizing a hydrotreating catalyst wherein the support is prepared by mixing of peptized alumina with an amorphous silica or crystalline aluminum silicate as one component of the catalyst. The catalyst comprises a group VI metal and/or a group VIII metal of the periodic table. The catalyst exhibits improved hydrocracking, hydrodesulfurization and hydrodemetallization activities and has a relatively stable life with time on stream. Thus, the invention concerns a method for developing a catalyst for hydroprocessing of heavy hydrocarbon feedstocks which is characterized by two steps: the first step consists of the optimization of a catalyst formulation with respect to the textural properties, number of acid sites, active metal incorporation. The second step consists of the evaluation with real feedstock and catalyst stability with time-on-stream.

18 Claims, 10 Drawing Sheets

(51) Int. Cl.

| | | |
|---|---|---|
| *B01J 21/12* | (2006.01) | |
| *B01J 23/85* | (2006.01) | |
| *B01J 23/882* | (2006.01) | |
| *B01J 23/883* | (2006.01) | |
| *B01J 23/888* | (2006.01) | |
| *B01J 35/02* | (2006.01) | |
| *B01J 35/10* | (2006.01) | |
| *B01J 37/02* | (2006.01) | |
| *B01J 37/03* | (2006.01) | |
| *C10G 47/16* | (2006.01) | |
| *B01J 23/24* | (2006.01) | |
| *B01J 23/74* | (2006.01) | |
| *B01J 29/076* | (2006.01) | |
| *B01J 37/00* | (2006.01) | |

(52) U.S. Cl.
CPC .............. *B01J 23/883* (2013.01); *B01J 23/888* (2013.01); *B01J 35/023* (2013.01); *B01J 35/108* (2013.01); *B01J 35/1019* (2013.01); *B01J 35/1061* (2013.01); *B01J 35/1095* (2013.01); *B01J 37/0205* (2013.01); *B01J 37/0207* (2013.01); *B01J 37/031* (2013.01); *B01J 37/036* (2013.01); *C10G 47/16* (2013.01); *C10G 47/20* (2013.01); *B01J 23/24* (2013.01); *B01J 23/74* (2013.01); *B01J 29/076* (2013.01); *B01J 35/1038* (2013.01); *B01J 35/1042* (2013.01); *B01J 37/0009* (2013.01); *B01J 2229/42* (2013.01)

(56) References Cited

U.S. PATENT DOCUMENTS

| | | |
|---|---|---|
| 3,459,680 A | 8/1969 | Plank et al. |
| 3,536,605 A | 10/1970 | Kittrell |
| 3,835,027 A | 9/1974 | Ward |
| 3,974,099 A | 8/1976 | Lussier et al. |
| 4,111,846 A | 9/1978 | Elliott, Jr. |
| 4,238,360 A | 12/1980 | Alafandi et al. |
| 4,246,138 A | 1/1981 | Alafandi et al. |
| 4,264,474 A | 4/1981 | Alafandi et al. |
| 4,289,653 A | 9/1981 | Jaffe |
| 4,419,271 A | 12/1983 | Ward |
| 4,600,498 A | 7/1986 | Ward |
| 4,738,940 A | 4/1988 | Dufresne et al. |
| 4,762,813 A * | 8/1988 | Ward .............. 502/66 |
| 4,857,171 A | 8/1989 | Hoek et al. |
| 4,988,659 A | 1/1991 | Pecoraro |
| 5,277,793 A * | 1/1994 | Bezman et al. .......... 208/111.35 |
| 5,358,917 A * | 10/1994 | Van Veen et al. ............... 502/66 |
| 6,399,530 B1 | 6/2002 | Chen et al. |
| 6,902,664 B2 * | 6/2005 | Timken .................... 208/111.01 |
| 6,995,112 B2 | 2/2006 | Timken et al. |
| 7,541,310 B2 * | 6/2009 | Espinoza et al. ............. 502/326 |
| 2004/0138059 A1 * | 7/2004 | Euzen et al. ................... 502/255 |
| 2007/0123416 A1 * | 5/2007 | Mayoral et al. ............... 502/309 |
| 2007/0209968 A1 * | 9/2007 | Euzen ........................ 208/108 |

OTHER PUBLICATIONS

Leyva et al., Surface characterization of Al2O3—SiO2 supported NiMo catalysts: An effect of support composition, Catalysis Today 130 (2008) 345-353.

Ding et al., HDS, HDN, HDA, and hydrocracking of model compounds over Mo—Ni catalysts with various acidities, Applied Catalysis A: General 319 (2007) 25-37.

* cited by examiner

MILD ACIDIC CATALYST FOR HYDROPROCESSING OF HEAVY CRUDE OIL AND RESIDUE AND ITS SYNTHESIS PROCEDURE

TECHNICAL FIELD

The present invention relates to a mild acidic catalyst for a selective hydrocracking of heavy crude oil and residua, for preventing the fast deactivation of catalyst and its method of preparation. The catalyst synthesized in the present invention has high amount of large pores (macro-porosity), which are not deactivated quickly by the contaminants, particularly at high concentration of metals that are present in heavy crude oil and residues. The catalyst for hydroprocessing of heavy crude oil and residue has been developed particularly to hydrocrack crude bottom-of-barrel to enhance the yields of gasoline and middle distillates along with the optimum removal of metals (Ni and V), sulfur and nitrogen.

BACKGROUND OF THE INVENTION

The application of hydroprocessing on the fossil fuels in the petroleum industry is to produce fuels with low content of sulfur, metals, and nitrogen. Because crude oils are formed by a mixture of complex hydrocarbons, the rate of reactions is the controlling step in these processes, thus, it is important to have a relatively large accessible specific surface area catalyst (more catalytic sites in a given volume) in order to allow for the most effective use of reactor volume. This in turn requires the entire volume of the support or catalyst is made of material with high-surface-area material, and the pore structure of the material is such that the reactants can diffuse into and products can diffuse outside the volume of the catalyst effectively over relatively long distances. The catalysts used have a variety of shapes (e.g., pellets, pills, beads, rings, tri-lobes, etc.) and are generally formed of alumina as catalysts or catalyst support for using in catalytic reactions. These structures are typically formed by extrusion of alumina or other selected oxides, followed by drying and calcining. However, beds packed with pellets tend to exhibit relatively high resistance to flow and also develop preferential flow paths, which is particularly important in the case of complex feed of heavy fractions and residues. The method of support preparation (silica-alumina and zeolite-alumina) usually affects the physical and chemical properties of the catalysts such as cracking activity, textural properties and mechanical strength of support or catalyst. The mixed oxide, silica-alumina in the present invention is used as support for hydroprocessing particularly in catalytic reactions that need acidic catalysts, or can optionally be combined with zeolites, and other inorganic oxides.

The present invention provides a method of synthesis of support for hydroprocessing catalyst either amorphous $SiO_2$—$Al_2O_3$ at various $SiO_2/Al_2O_3$ ratios or ultra-stable Y zeolite with alumina, which creates acidic sites and enhances catalyst activity of hydrocracking which significantly improves the yields of lower boiling point fractions. The use of such supports and catalysts and methods for their preparation are described in the following patent literature.

U.S. Pat. No. 4,289,653 reports the preparation of a support extruded catalyst by mixing aluminum sulfate and sulfuric acid with sodium silicate to form a silica sol in an alumina salt solution (pH≈1-3), a further increase in pH of 7 to 8 by adding $NH_4OH$ forms a co-gelled mass. The co-gelled mass is mulled with peptizing agent, a metal from Group VIB and Group VIII to form a paste which can be extruded, dried and calcined. The catalyst is used for the denitrification of middle distillates.

U.S. Pat. No. 4,988,659 deals with the preparation of a silica-alumina matrix by a method which comprises mixing a silicate solution with an aqueous solution of an acid aluminum salt to a pH range of 1 to 4; slowly adding a base at high stirring, and adjusting the said slurry to a pH range of 5 to 9; aging the said co-gel at a temperature from ambient to 95° C. The co-gelled mass is spray dried and calcined and subsequently these catalysts are tested in Fluid Catalytic Cracking (FCC) process units to conversion of hydrocarbon feeds to produce high octane gasoline.

U.S. Pat. No. 3,974,099 describes a silica-alumina co-gel prepared from a mixture of sodium silicate and sodium aluminate. The resultant gel is acidified and alumina is precipitated by reaction with excess sodium aluminate in the reaction mixture. The dried gel is exchanged with ammonium sulfate to reduce the $Na_2O$ content to less than 1%.

U.S. Pat. No. 3,423,332 states an improved cracking catalyst that can be produced from a commercial silica-alumina gel catalyst containing 13% $Al_2O_3$. The product is activated by digestion of a gel at a high pH and elevated temperature to produce an amorphous product. The sodium content of the product is reduced by cations exchange such as Ca, Mg, $NH_4$ and rare earth.

U.S. Pat. No. 3,974,099 describes the preparation of highly active amorphous silica-alumina catalysts. The catalysts may contain substantial quantities of alumina.

U.S. Pat. No. 3,459,680 reports the preparation of hydrocarbon conversion catalysts containing zeolite dispersed in an inorganic oxide matrix. The matrix may include silica-alumina-rare earth oxide components.

U.S. Pat. Nos. 4,238,360, 4,246,138 and 4,264,474 describe the preparation of silica-alumina gels and catalysts which are exchanged with solutions of rare earth salts. The resulting catalysts are used in the conversion of hydrocarbons.

U.S. Pat. No. 4,111,846 presents the preparation of hydrosols and catalysts wherein an alkali metal silicate solution reacts with a mixture of titanium and aluminum salts. A mix pump is used to rapidly and efficiently combine the silicate and mixed salt solutions.

U.S. Pat. No. 4,289,653 deals with the preparation of silica hydrosols that are used as binders in the manufacture of particulate cracking catalysts. The silica sol contains salts of titania, zirconia, iron or ceria which modify the physical and/or catalytic characteristics of the catalyst.

U.S. Pat. No. 6,902,664 describes the preparation of a catalyst whose composition comprises a low acidity using a certain amount of highly dealuminated ultra stable Y zeolite. The invention discloses a process for converting hydrocarbonaceous oils comprising the catalyst with metals Mo (W), Ni, Co, Pt, Pd and their mixture thereof. The process is mainly applied for lube hydroprocessing in a single as well as two-stage hydrocracking.

U.S. Pat. No. 6,995,112 presents the preparation of amorphous silica-alumina hydrosols which are used as lube oil hydrofinishing process to produce lubricating oil base stock.

U.S. Pat. No. 4,600,498 describes a catalyst containing hydrogenation metals supported on a base having (1) a crystalline alumino-silicate zeolite, which has cracking activity, and (2) a dispersion of silica-alumina in an alumina matrix which is employed for mild hydrocracking of vacuum gas oil.

U.S. Pat. No. 3,130,007 reports synthesis of pure Y zeolite with a number of modifications, one of which is ultra-stable Y zeolite as described in U.S. Pat. No. 3,536,605. The Y Zeolite has been constantly improved by techniques like ammonium ion exchange, de-alumination conditions, acid extraction of octahedral aluminium, and various forms of drying and calcination in order to enhance the performance of the hydrocracking catalysts.

U.S. Pat. No. 3,835,027 describes a catalyst containing at least one amorphous refractory oxide, a crystalline zeolitic aluminosilicate and a metal component for hydrogenation selected from the Group VI and VIII and their sulfides and oxides. The patent revealed that the added crystalline zeolite enhances the catalytic and denitrogenation activity of the catalyst.

U.S. Pat. No. 4,857,171 reports a process for converting hydrocarbon oils comprising contacting the oil with a catalyst which consists essentially of a Y zeolite, a silica based amorphous cracking component, a binder and at least one hydrogenation metal component selected from the Group VI and/or a Group VIII metal and mixtures thereof.

U.S. Pat. No. 4,419,271 discusses a composition useful as a catalyst base for supporting active hydrogenation metal components or to carry out hydrocarbon conversion by acidic catalysts, comprising an intimate heterogeneous mixture (1) Y zeolite modified by crystalline alumino-silicate (2) silica-alumina dispersed in a gamma alumina matrix.

EP 0162,733 (U.S. Pat. No. 4,738,940) reports the use of Y zeolite as a catalyst component for hydrocracking which has a narrow pore diameter distribution, that means at least 80% of the total pore volume is made up of pores having a diameter of less than 2 nm, being approximately 85% of total volume.

GB-A-2114594 Patent describes a process for the production of middle distillates using a catalyst comprising the so-called expanded pore faujasitic zeolites. The pore expansion referred in the said patent specification has been obtained by contacting faujasitic zeolite with steam at different temperature, followed by contacting the steamed faujasitic zeolite with an acid, preferably an acid having a pH less than 2.

U.S. Pat. No. 6,399,530 reveals the preparation of an acidic amorphous silica-alumina catalyst that has a large pore volume. The acidic component is inserted by using silica-alumina in a modified Y zeolite. The catalytic activities were evaluated for hydrocracking of vacuum gas oil to produce middle distillates. The amorphous silica-alumina has a $SiO_2$ content of 10-50 wt. %, a specific surface area of 300-600 $m^2/g$, and a pore volume of 0.8-1.5 ml/g.

Examples of the above patents are representative of the state-of-the-art related catalyst formulations and other catalyst useful components along with their process conditions. Most of the catalysts are used for light feedstock hydroprocessing and the method of support and catalyst preparation and its composition are entirely different than those of the catalysts of the present invention.

The present invention is better compared with the above said references due to providing a catalyst having large pore diameter and bi-functional in nature (i.e., hydrocracking and hydrogenation), which contributes the composition of the support (acidic) as well as active metal sites. The present patent also supplies a procedure in order to obtain a catalyst and its synthesis. Thus, one object of the present invention is to provide a method of synthesis.

Therefore, the objective of this invention is to produce a catalyst for hydrocracking of heavy crude oil along with high metal retention capacity during the hydroprocessing of heavy oil and residue as well as providing a long unit life and upgraded oil.

Another objective of the present invention is to develop a procedure for a catalyst having acidic component (hydrocracking function) and large pore diameter to remove effectively metals (Ni+V), sulfur, nitrogen contaminants in order to protect fast deactivation of catalyst. The present modified support materials have proven to be superior for organic compound conversion reactions. Such modified materials, the method of their modification and their use in heavy oil conversion are not so far disclosed.

SUMMARY OF THE INVENTION

The catalyst of the present invention has a moderate acidity for hydroprocessing of heavy crude oil and residua, and has a support selected from the group consisting of amorphous silica, crystalline aluminum silicate, USY zeolite, and mixtures thereof having peptized alumina. The catalyst comprises active metal components from group VIB and group VIII. Preferably, the support comprises (a) an amorphous silica-alumina having approximately 5 to 50 weight percent $SiO_2$ or (b) a mixture of crystalline alumina-silicate having approximately 5 to 25 weight percent of USY zeolite and (c) the active metal components are Mo or W from Group VIB and Co or Ni from Group VIIIB.

The silica-alumina support can be characterized by the textural properties: specific surface area (SSA) of 140 to 260 m.sup.2/g, total pore volume (PV) of 0.4 to 0.8 cm.sup.3/g, and average of pore diameter (APD) of 7.0 to 16.0. Likewise, the mixture of crystalline silicate-alumina and USY zeolite can have the following textural properties: specific surface area (SSA) of 140 to 200 m.sup.2/g, total pore volume (PV) of 0.3 to 0.5 cm.sup.3/g, and average of pore diameter (APD) of 4.0 to 13 nm. A preferred concentration of active metals is 4-9 weight % molybdenum and 1-3 weight % nickel or cobalt.

According to one aspect of the present invention, a hydroprocessing catalyst may be prepared by a process which comprises: a) preparation of a support by mixing zeolite with alumina; b) adding water and 3 weight % nitric acid to make a homogeneous paste; c) extruding the homogeneous paste into a cylindrical shape; d) drying the extrudates for 12 hours at 120° C.; e) calcining the dried extrudates during 4 hours at 550° C.; incorporating metallic components of group VIB and group VIIIB using the aqueous incipient wetness impregnation method, with nickel nitrate, and ammonia meta-tungstate; g) drying the impregnated extrudates under atmospheric conditions with a hot air stream for 1 hour and then at 120° C. for 12 hours; and h) calcining the catalyst at 450° C. for 4 hours. Preferably, the support is prepared by homogenous precipitation (HP) or dry mixing (DM) and using molybdenum or tungsten as the group VIB metallic component and nickel or cobalt as the group VIII metallic component.

According to another aspect of the invention, the support is prepared by homogeneous precipitation of $SiO_2$—$Al_2O_3$ which comprises: a) preparation of aqueous solutions of sodium silicate solution (2-5 molar $SiO_2$) and aluminum nitrate (2-5 molar $Al_2O_3$) to ensure sol-gel formation of acid-base condition by vigorous mixing; b) addition of aluminum solution in the presence of a basic precipitant such as ammonium hydroxide to the acidified solution to a gel and increases pH by adding $NH_4OH$ above 3 for co-gelation of silica and alumina species at a constant pH of 4 to 8; c) adding sufficient quantity of precipitant at the end of the co-gelation to obtain a final pH of the solution in the range of 8 to 9 and complete the reaction; d) filtering the resulting solid mass of silica-alumina (sol-gel) from the mother liquor; e) washing with water to remove sodium ions; aging the co-gel for approximately 15 hours at a temperature in the range of 60 to 80° C. to convert gel into the sol; g) the sol is processed using the wet extrusion method; h) drying the extrudates at 120° C.; i)

calcining at 550° C. for 5 hours; j) impregnating the calcined support with the active metal using the incipient wetness method with a group VIB metal in the first step and group VIIIB in the second step as promoters; k) drying of the catalysts at room temperature, after that at 120° C. for 12 hours; and finally 1) calcination at 450° C. for 4 hours.

According to another aspect of the invention, a ZeoAl support is prepared by using a dry mixture (zeolite+aluminum) which comprises: a) mechanically mixing Pural SB (25 weight %), Pural SB TH200 (50 weight %) boehmites and USY zeolite (25 weight %) with 3.5% of $HNO_3$ (volume/volume) and distilled water; b) extruding the paste to obtain extrudates having a cylindrical shape and diameter of 1/16"; c) drying the extrudate at 100-120° C. for 12-15 hours; d) calcining of the dried extrudates at 500-550° C. for 4 hours with excess air to obtain a gamma alumina support; e) successive impregnation of the supports, first with ammonium heptamolybdate and then with nickel nitrate to obtain a metal content of 10 wt % Mo, and 4.3 wt % of Ni; f) aging of the resulting solids for 12-18 hours at room temperature; g) drying at 100-120° C.; h) calcination using a heating ramp of 2° C./min up to 120° C. and holding at this temperature for 2 hours; i) increasing the temperature up to 300° C. and holding for 2 hours; j) increasing the temperature up to 450° C. for 4 hours; k) impregnating the calcined support with the active metal by sequential impregnation method using a typical metal of group VIB, such as molybdenum (or tungsten), the first step and VIIIB group, such as nickel (or cobalt) in second stage as a promoter; 1) maintaining the extrudate wet overnight; m) drying the catalyst at a temperature between ambient temperature and 120° C. for 12 hours; and n) calcining the catalyst at 450° C. for 4 hours.

According to another aspect of the invention, a method for the hydroprocessing of a heavy crude or residua feedstock comprises contacting the feedstock with a catalyst having a support selected from the group consisting of amorphous silica, crystalline aluminum silicate, USY zeolite and mixtures thereof, containing peptized alumina and comprising active metal components from group VIB and group VIII at a temperature of 320 to 450° C., a partial hydrogen pressure from 4 to 15 MPa, and a LHSV of 0.2 to 3 $h^{-1}$. The present method of hydroprocessing of the feedstock can result in hydrodemetallization of 25 to 60%, hydrodesulfurization of 20 to 70 weight %, hydrocracking of 20 to 40 weight %, and hydrodenitrogenation of 25 to 5 weight %.

BRIEF DESCRIPTION OF THE DRAWINGS

The manner in which the foregoing and other objects are achieved in accordance with the present invention will be better understood in view of the following detailed description and accompanying drawings, which form a part of this specification, and wherein.

DETAILED DESCRIPTION OF THE INVENTION

Heavy oil feedstocks contain metals mainly concentrated as porphyrins and associated with other large molecules containing condensed poly-aromatic rings. Therefore, the pore structure of the catalysts should be designed to handle these metal compounds of large molecular size as well as asphaltene molecules present in heavy crude, which need to break and produce small molecules.

The present invention is directed to a process which uses a hydrocracking catalyst comprising an intimate composite of one or more hydrogenation components, and acidic components using $SiO_2$—$Al_2O_3$ either crystalline (zeolite) or amorphous. In the case of crystalline $SiO_2$—$Al_2O_3$, a zeolite is introduced into a matrix of alumina while the amorphous $SiO_2$—$Al_2O_3$ is used directly as support. The hydrogenation components are in the form of metals sulfides of molybdenum or tungsten (Group VIB) along with the promoters metals such as Co or Ni (Group VIII). The hydrocracking catalyst is supported upon an acidic material which constitutes the hydrocracking component, e.g. silica or silica-alumina and/or zeolites. Of course, the method of preparation of such a kind of catalyst is an "art" in order to distribute cracking components such as zeolites, silica-alumina into the inner part of the catalyst extrudate, which prevents direct expose of acid sites on the surface.

The quantity of zeolite can be variable but in this invention it is about 25% by weight of matrix. The matrix is usually silica, alumina, silica-alumina, silica-magnesia, clay or a mixture of two or more of these products. By using acidic catalysts the reduction in molecular weight occurs primarily via catalytic hydrocracking rather through thermal cracking.

The performance of heavy oil hydroprocessing catalysts is often affected by pore diffusion limitations generated due to the carbon and metal deposition. The variation of support composition ($SiO_2$—$Al_2O_3$) is a way to find out the optimum pore diameter of the catalyst. The reason behind the optimum pore diameter is to obtain more selective activity, which depends on the active metal dispersion, acidity and pore diameter of the catalysts. However, heavy crude oils contain high amounts of sulfur and other contaminants that exhibit different reactivities during hydroprocessing, and depending on their complexity, can affect the course of reactions differently, to the point that they can eventually deactivate the catalyst at a faster rate. The catalysts cover a wide range of activities from ones that crack at conventionally high temperatures to those that approach the low-temperature performance of acid catalysts. The major concern for crude oil hydroprocessing is to upgrade crude oil and remove maximum amount of contaminants.

Thus, the present invention is a development of a catalyst with large pore diameter and its bi-functional in nature, which is a contribution of an acidic support and active metal sites. The representative patents described previously disclosed catalyst formulations and other catalyst useful components along with their process conditions. All of them are with silica-alumina and/or with zeolite as components of support and catalyst with different active metal composition, which vary substantially in their preparation method as well as in their application to the nature of the feedstock compared with the catalysts used for the present invention.

To solve the aforesaid problems existing in the prior art, the objective of the present invention is to provide a catalyst for hydroconversion of a heavy hydrocarbon feedstock with high metal retention capacity during the operation with heavy oil and residues, thereby prolonging the lifetime of units as well as upgrading the crude oil.

Another objective of the present invention is to develop a procedure for a catalyst having acidic component (hydrocracking function) and large pore diameter to remove effectively metals (Ni+V), sulfur, nitrogen contaminants in order to protect fast deactivation of catalyst. The present modified support materials have proven to be superior for organic compound conversion reactions. Such modified materials, the method of their modification and their use in heavy oil conversion are not so far disclosed.

In a general procedure, the catalysts were prepared using different amounts of zeolite and silica oxide in alumina. The formulation of these catalysts is reported in Table 1. A support was prepared by mixing a zeolite with alumina, where water and 3 weight % nitric acid were added in order to peptize alumina and achieve an extrudable mixture, which was then extruded into cylindrical shape using dry extrusion. The extrudates were dried statically for 12 hours at 120° C. and then calcined for 4 hours at 550° C. The metals, hydrogenation components from Group VIIIB [nickel (cobalt)] and VIB [molybdenum (tungsten)] in the periodic table, were incorporated by using incipient wet-ness impregnation method of nickel nitrate and ammonium metatungstate aqueous solution. The impregnated extrudates were dried at ambient conditions during 1 hour and then at 120° C. for 12 hours and finally calcined at 450° C. for 4 hours.

TABLE 1

Properties and composition of supported NiMo, NiW and CoMo catalysts

| | Catalyst | | | | |
|---|---|---|---|---|---|
| | NiMo/SA-31 (Cat-1) | NiMo/SA-56 (Cat-2) | NiMo/ZeoAl (Cat-3) | NiW/ZeoAl (Cat-4) | CoMo/ZeoAl (Cat-5) |
| Support composition, wt. % | | | | | |
| $SiO_2/(SiO_2 + Al_2O_3)$ | 0.31 | 0.56 | — | — | — |
| USY zeolite | — | — | 25 | 25 | 25 |
| $Al_2O_3$ (TH200) | — | — | 50 | 50 | 50 |
| $Al_2O_3$ (Pural SB) | — | — | 25 | 25 | 25 |
| $Na_2O$ | 0.1 | 0.8 | 0.02 | 0.02 | 0.02 |
| Catalyst physical properties | | | | | |
| Shape | Cylindrical | Cylindrical | Cylindrical | Cylindrical | Cylindrical |
| Size, in | 1/12 | 1/12 | 1/12 | 1/12 | 1/12 |
| Mo (W), wt. % | 4.6 | 4.6 | 6.5 | (19.2) | 6.4 |
| Ni (Co), wt. % | 1.7 | 1.7 | 1.7 | 5.2 | (2.0) |
| Textural properties | | | | | |
| SSA, $m^2/g$ | 255 | 167 | 168 | 131.0 | 160.3 |
| TPV, ml/g | 0.54 | 0.58 | 0.37 | 0.36 | 0.44 |
| APD, nm | 8.5 | 14.0 | 8.8 | 10.9 | 11.1 |
| Pore Size Distribution, vol. % | | | | | |
| <5 nm | 19.5 | 7.9 | 6 | 8.3 | 7.5 |
| 5-10 nm | 31.1 | 15.7 | 38 | 23.5 | 23.9 |
| 10-25 nm | 33.1 | 27.5 | 38 | 41.1 | 41.9 |
| 25-50 nm | 10.5 | 22.7 | 11 | 19 | 21 |
| 50-100 nm | 4.1 | 16.2 | 4 | 4.8 | 3.8 |
| >100 nm | 1.3 | 8.5 | 2 | 3.3 | 1.9 |

Figure 1:
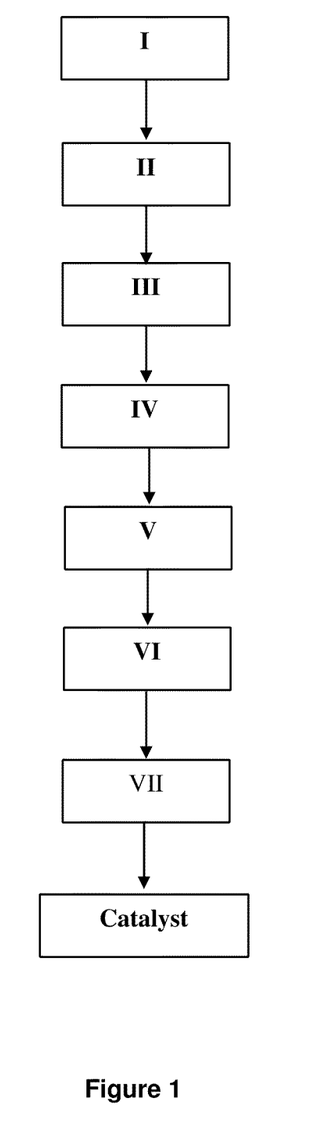
FIG. 1 is a schematic drawing of the support synthesis by homogenous precipitation (HP) method of the invention, showing the steps for manufacturing a $SiO_2$—$Al_2O_3$ (SA) supported hydroprocessing catalyst.

FIG. 1 is the schematic diagram of different steps used for the preparation of mixed oxide using the homogeneous precipitation (HP) method for $SiO_2$—$Al2O_3$. This support was obtained by mixing of sodium silicate solution (2-5 molar SiO2) and an aqueous mixture of aluminum nitrate solution (2-5 molar $Al_2O_3$). This method is preferred due to commercial availability and to ensure formation of the sol-gel under acid-base conditions by using vigorous stirring, that is likely to result in gel formation (step I). An aluminum solution is added in presence of a basic precipitant such as ammonium hydroxide which is incorporated with the acidified gel solution to a bath and pH is increased by adding $NH_4OH$. The incorporation of the precipitant raises the pH of the sol-gel above 3, resulting in co-gelling the silica and alumina species. Preferably the co-gellation is carried out at a constant pH of approximately 4 to 8 to avoid the highly viscous mixture, which occurs in the low pH range (i.e. 3 to 4). A sufficient quantity of precipitant is added at the end of the co-gellation to obtain a final pH of the solution in the range of 8 to 9 for completeness of reaction (step II). The precipitant preferably used in this invention is an ammonium hydroxide solution having a concentration of 10 to 15% $NH_3$ by volume in water. The co-gel should be aged for approximately 15 hours at a temperature in the range of 60 to 80° C. to convert gel into the sol and obtain desired properties of the support (step III). The resulting solid mass of silica-alumina sol-gel is then filtered from the mother liquor and water washed to remove the sodium ions (step IV). The product obtained is finally extruded by wet extrusion method (step V). The extrudates were dried at 120° C. and finally calcined at 550° C. for 5 hours (step VI). The calcined support was impregnated with the active metal by sequential impregnation method using typical group IVB metal [Molybdenum (Tungsten)] in the first step and group VIIIB [Nickel (Cobalt)] in the second step as promoters (step VII). The catalysts were dried at room temperature, after that at 120° C. for 12 h, and finally calcined at 450° C. for 4 hours. The catalysts prepared with this method with variation of support composition and their physico-chemical properties are presented in Table 1 (catalysts 1 and 2).

Figure 2:
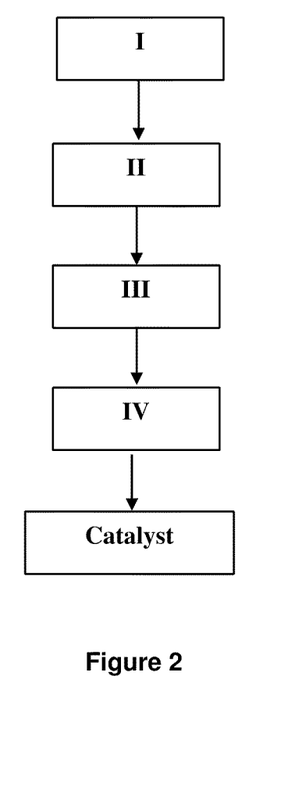
FIG. 2 is a schematic drawing of the support synthesis using dry mixing (DM) procedure of the present invention, showing the steps for manufacturing a zeolite-$Al_2O_3$ (ZeoAl) supported hydroprocessing catalyst.

FIG. 2 illustrates a schematic diagram of different steps used for the preparation of a zeolite-based catalysts with a dry mixture (DM) procedure for synthesis of (zeolite+aluminium, ZeoAl) support by a mechanical mixture of Pural SB (25 wt. %), Pural SB TH200 (50 wt %) boehmites and 25 weight % of USY zeolite, which were well mixed in equal proportion considering 25% moisture in both boehmite alumina samples. Required quantity of aluminum oxyhydroxide (boehmite) alumina is first dried at 120° C. for 5 h (I). The following steps are dry mixing of different boehmite and ultra-stable Y zeolite, and mixing continuously with 3.5% (v/v as peptizing agent) of $HNO_3$ and distilled $H_2O$ (II). The paste was extruded in 1/16" cylinder (III), and dried at 100-120° C. for 12-15 hours. The dried extrudates were calcined at 500-550° C. for 4 hours with purging excess dry air to obtain a gamma alumina support. Subsequently, these supports were impregnated by successive impregnation, first with ammonium heptamolybdate (AHM) and then with nickel nitrate to obtain a metal content of 10 wt % of Mo, and 4.3 wt % of Ni (IV). The resulting solids were allowed to age for 12-18 hours, and then were dried at 100-120° C. and calcined using a heating ramp of 2° C./min up to 120° C. and remained at this temperature for 2 hours, then the temperature was rose up to 300° C. and remained for 2 hours, and finally up to 450° C. and remained for 4 hours.

The calcined support was impregnated with the active metal in a sequential impregnation method using typical metal of group IVB [Molybdenum (Tungsten)] in the first step and metal of group VIIIB [Nickel (Cobalt)] in the second step as promoters. The metal solution was added to the support extrudates gradually while tumbling the extrudates. When the solution addition was completed, the soaked extrudates were aged over night. The catalysts were dried at room temperature, 120° C. for 12 h, and finally calcined at 450° C. for 4 hours. The catalysts prepared with this method with variation of support composition and their physical and chemical properties are presented in Table 1 (catalysts 3, 4, 5).

Figure 3:
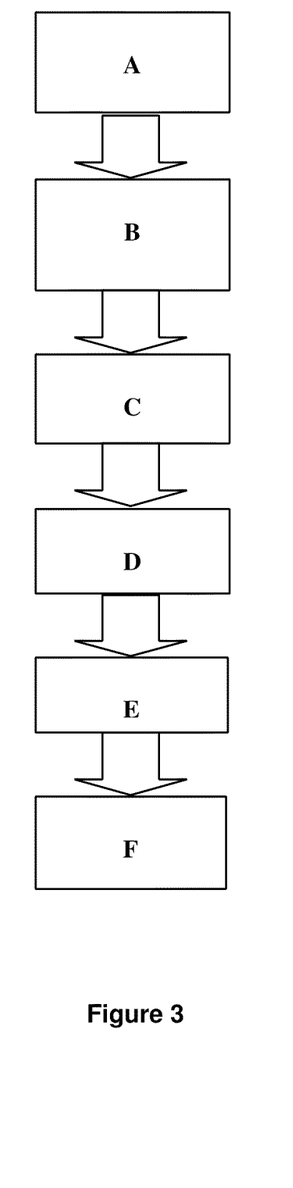
FIG. 3 is a flow diagram showing the steps for activation or pretreatment of catalyst of the present invention.

Detailed description of FIG. 3 (catalyst pretreatment and catalytic test): the reactor employed for catalysts activity tests was operated in a fixed bed using up-flow mode. FIG. 3 is a schematic representation of the methodology used for the reaction evaluation of the catalysts described in the examples of the present invention. In step A, the reactor is loaded with 10 mL of catalyst and 10 mL of inert material (SiC). Stage B corresponds to the hermeticity test of the equipment at a pressure 10% higher than that used in normal operation in order to detect any leak in the experimental set up. The stage C represents the sulfidation of the catalyst performed with straight-run gasoil (SRGO) from the atmospheric distillation of petroleum to which 2 wt. % sulfur was added as dimethyl disulfide (DMDS). The following operating conditions were used for the sulfidation of the catalyst: reaction temperature of 320° C., pressure of 28 $Kg/cm^2$, LHSV of 2.0 $h^{-1}$ and hydrogen/hydrocarbon ratio of 2000 $ft^3/bbl$. The step D corresponds to the feeding of the mixture of oil and hydrogen to the reactor in ascending mode. The composition and properties of feedstock are presented in Table 2. The operating conditions in stage E are as follows: temperature of 380° C., pressure of 7.0 MPa, hydrogen/hydrocarbon ratio of 356 $m^3/m^3$, and LHSV of 1.0 $h^{-1}$. In stage E the reaction takes place during 204 h and during this time samples of product are taken every 12 h. Finally, in stage F, analysis of the products from the reactor is performed. The selected conditions for the evaluation of catalysts at high pressure reactor are those presented in Table 3.

TABLE 2

Typical properties of heavy crude oil used as feedstock

| Properties | Feedstock |
|---|---|
| Elemental analysis | |
| C, wt. % | 86.9 |
| H, wt. % | 5.3 |
| N, wt. % | 0.3 |
| S, wt. % | 3.52 |
| Metals, wppm | |
| Ni | 49.5 |
| V | 273.0 |
| (Ni + V) | 322.5 |
| Ca | 11.26 |
| Mg | 2.04 |
| Na | 44.83 |
| K | 20.25 |
| Fe | 2.16 |
| Asphaltene, wt. % (n-$C_7$ insololubles) | 12.7 |
| Physical properties | |
| Specific gravity, 20/4° C. | 0.9251 |
| Ramscarbon, wt. % | 10.87 |
| API gravity | 21.31 |

TABLE 3

Reaction conditions for fixed-bed up flow reactors

| Conditions | |
|---|---|
| Temperature, ° C. | 380 |
| Pressure, MPa | 7.0 |
| Hydrogen flow, l/h | 4.6 |
| Flow of heavy crude, mL/h | 10 |
| LHSV, $h^{-1}$ | 1.0 |
| Hydrogen/Oil ratio, $m^3/m^3$ | 56.63 |
| Mode of operation | Up-flow |

TABLE 3-continued

Reaction conditions for fixed-bed up flow reactors

| Conditions | |
|---|---|
| Time-on-stream, h | 204 |
| Catalyst volume, mL (g) | 10 (6.8) |
| Extrudate diameter, mm | 2.2 |
| Extrudate length, mm | 5-7 |
| Crushing strength, kg | 2.8 |

EXAMPLES

The following examples are provided to illustrate the behavior of the catalysts in this invention and their use in hydroprocessing of heavy crude oil and residua. These examples should not be considered as limitations of the invention, but merely inform how to make the appropriate support, catalyst and their evaluation, reflecting the present invention. The reactor had a fixed-bed of a particulate supported transitions metal hydroprocessing catalyst. The detailed reaction conditions for the evaluation of this invention are given in the Table 3.

The catalyst in the present invention was loaded to a reactor where the unit has automatic controls for pressure, flow of reactants, and temperature. During the reaction the temperature was controlled at different height of reactor through outside as well as inside thermo-well extended up through the center of the reactor. The hydrocarbon feedstock was fed to the unit by means of a LDC pump, which is a positive-displacement pump. The products of the run were obtained from the product receiver and were analyzed by various relevant techniques. Catalyst activities for HDS, HDN, HDM and HDAs are shown in FIGS. 4-8. The catalyst evaluation was carried out in once-through micro-flow equipment which had been loaded with three different zones diluted with 1:1 volume ratio of SiC and presulfided catalyst.

Example 1

The silica-alumina (SA) support was co-precipitated by the procedure of this invention that is homogeneous precipitation (HP) method, which was subsequently wet extruded, dried and calcined (FIG. 1). To obtain required acidity and textural properties of the solids, various compositions of $SiO_2$—$Al_2O_3$ are prepared. The silica supported catalysts containing 31 and 56 wt % were evaluated for heavy crude oil hydroprocessing in Example 1. The catalyst was prepared by incipient wetness impregnation of Ni and Mo using an aqueous solution containing ammonium heptamolybdate and nickel nitrate to the target metal loadings of 1.7 wt. % Ni and 4.6 wt. % Mo in the finished catalyst. The total volume of the solution matched the 100% water pore volume of the base extrudate sample (incipient wetness method). This catalyst is named Catalyst 1 (Cat-1) and its physical properties are summarized in Table 1 where it is observed that catalyst contains meso-porous.

The catalyst 1 of the present invention was loaded into a reactor and the run was carried out in a micro-scale test unit having automatic controls for pressure, flow of reactants, and temperature. The reactor process conditions are reported in Table 3. During the reaction the reactor temperatures were controlled at different heights of reactor through outside as well as inside thermo-well extended up through the center of the reactor. The hydrocarbon feedstock was fed to the unit by means of a LDC pump. The products of the run were obtained from the product receiver and were analyzed for relevant analysis.

Figure 4:
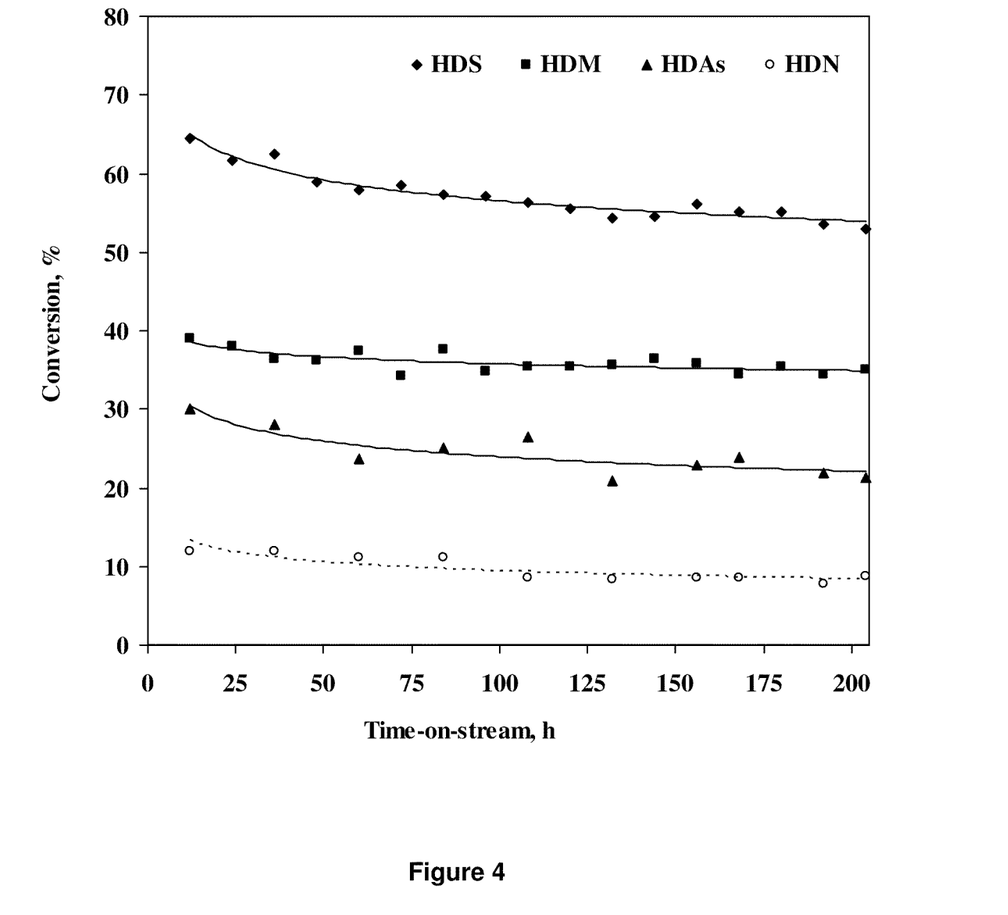
FIG. 4 shows the heavy crude oil hydroprocessing activities for a typical NiMo/$SiO_2$—$Al_2O_3$ (AS-31) mixed oxide supported catalyst of the present invention prepared by HP method and tested with a heavy crude oil feedstock (API gravity=21.3; S=3.5 wt. %, Ni+V=322 wppm) as function of time-on-stream (Catalyst 1).

FIG. 4 shows the hydroprocessing activities of heavy crude oil for the catalyst in the present invention which is supported on mixed oxides $NiMo/SiO_2$—$Al_2O_3$ (AS-31) and evaluated with a heavy crude feedstock (API gravity=21.3, S=3.5 weight %, Ni+V=322 ppm in weight), as function of run time (catalyst 1). The catalyst activities for HDS, HDN, HDM and HDAs are reported in this figure, which were slightly diminished with time-on-stream almost in similar magnitude.

Example 2

Catalyst 2 is a catalyst containing silica-alumina prepared accordingly to the procedure of the invention, is similar to that of Catalyst 1. For Catalyst 2, 56 weight % of silica in alumina of the invention from FIG. 1 was used to prepare the base extrudates. This catalyst is named Catalyst 2 (Cat-2) and its physical properties are summarized in Table 1. The texturales properties of the catalyst (Cat-2) are also shown in Table 1. It is observed that the catalyst contains meso- or macro pores. The catalyst 2 of the present invention was evaluated with similar operation conditions (Table 3) and procedure used for the catalyst 1.

Figure 5:
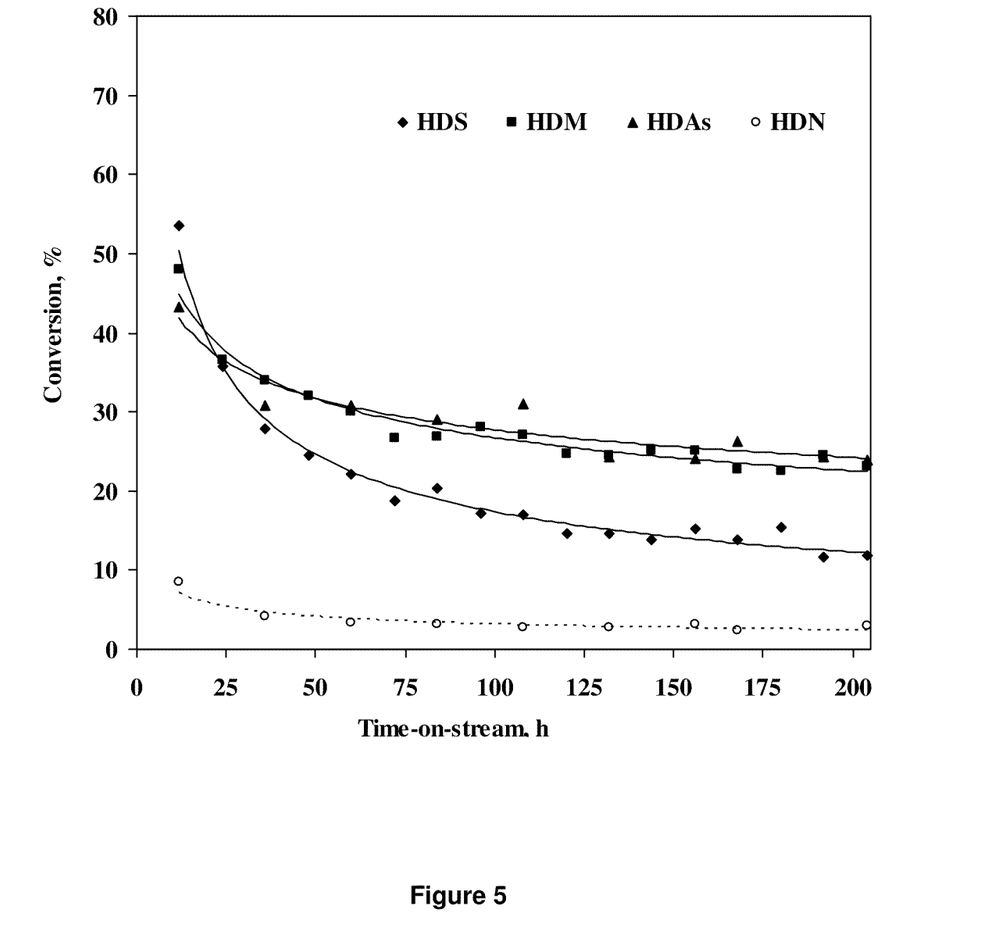
FIG. 5 shows the heavy crude oil hydroprocessing activities for a typical NiMo/$SiO_2$—$Al_2O_3$ (AS-56) mixed oxide supported catalyst of the present invention prepared by HP method and tested with a heavy crude oil feedstock (API gravity=21.3, S=3.5 wt. %, Ni+V=322 wppm) as function of time-on-stream (Catalyst 2).

FIG. 5 shows the hydroprocessing activities of heavy crude oil for the catalyst of the present invention supported on mixed oxides $NiMo/SiO_2$—$Al_2O_3$ (AS-56) and evaluated with a heavy crude feedstock (API gravity=21.3, S=3.5 weight %, Ni+V=322 ppm in weight), as a function of time-on-stream (catalyst 2). The initial activity of this catalyst is high for HDS, HDM and HDAs, but the deactivation of this catalyst with time-on-stream was slightly faster, which may correspond to the acidity of the catalyst.

Example 3

The zeolite-alumina (ZeoAl) support was synthesized by means of the procedure of the present invention with dry mixing (DM) method, which was extruded in humid, dried and calcined (FIG. 2). To take into account the effect of the acidic catalyst for heavy crude oil hydroprocessing, large quantities of a hydrocracking supported catalyst containing a Y zeolite were produced to enable different catalysts based on the same support to be prepared. So, 25% wt of a dealuminated Y zeolite, having framework $SiO_2/Al_2O_3$ ratio of 9 was used which was mixed with 75% wt of a matrix composed of boehmite or alumina (Pura) TH200 and Pural SB). This powder mixture was then mixed with an aqueous solution containing 2-4% by volume of nitric acid in water, and then mixed for 1 h. After mixing, the paste obtained was passed through a die with cylindrical orifices with a diameter of 1.4 mm. The extrudates were dried overnight at 120° C. then calcined at 550° C. for 4 hours in moist air. Cylindrical extrudates 1.2 mm in diameter were obtained with a specific surface area of 180 m²/g and a uni-modal pore size distribution centered on 9 nm.

Figure 6:
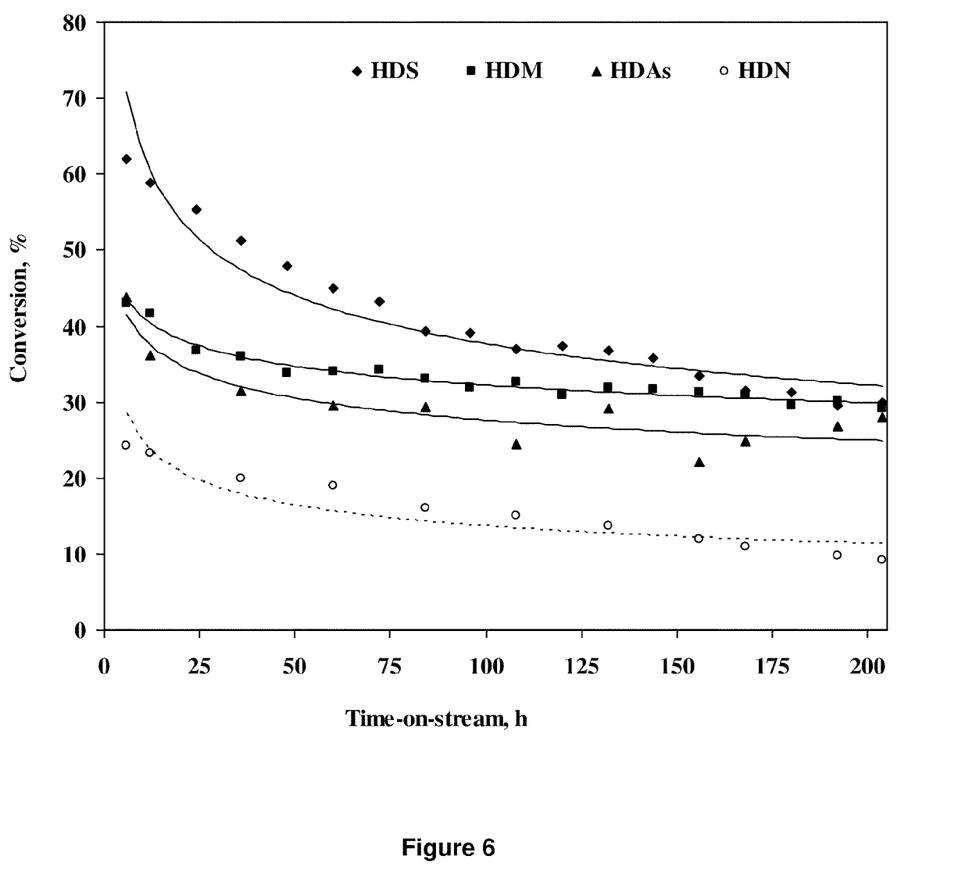
FIG. 6 shows the heavy crude oil hydroprocessing activities for a typical NiMo/$Al_2O_3$-USY zeolite (ZeoAl) mixed oxide supported catalyst of the present invention prepared by DM method and tested with a feedstock (API gravity=21.3, S=3.5 wt. %, Ni+V=322 wppm) as function of time-on-stream (Catalyst 3).

Impregnation of Ni and Mo was carried out using an aqueous solution containing ammonium heptamolybdate and nickel nitrate to achieve metal loadings of 2.7 wt % Ni and 5.6 wt % Mo in the finished catalyst. The extrudates were dried at 120° C. for 12 h and calcined at 450° C. for 4 hour with an excess dry air. This catalyst is named Catalyst 3 (Cat-3) and its physical properties are summarized in Table 1, where it is observed that the catalyst contains meso-porous. The catalyst 3 of the present invention was tested and its process conditions as well as feedstock properties are similar to those of catalysts Cat-1 and Cat-2 reported in previous examples. FIG. 6 shows the hydroprocessing activities of heavy crude oil for the catalyst of the present invention supported on mixed oxides NiMo/Al$_2$O$_3$-zeolite USY (ZeoAl) with a heavy crude feedstock (API gravity=21.3, S=3.5 weight %, Ni+V=322 ppm in weight) as a function of time-on-stream (catalyst 3).

Example 4

Catalyst 4, which is a catalyst containing zeolite-alumina (ZeoAl) obtained by the procedure of the present invention, was prepared employing the same procedure of catalyst 3. The metal content of Catalyst 4 of this invention is 5.2 wt. % Ni and 19 wt % of W and was studied using the procedure demonstrated in FIG. 2 to prepare the base extrudates. This catalyst is named Catalyst 4 (Cat-4) and its physical properties are summarized in Table 1. The textural properties of catalyst Cat-4 are shown in Table 1 where it is observed that the catalyst contains meso- and macro pores. Catalyst 4 of the present invention was evaluated and its process conditions and feed properties are similar than those of catalysts 1, 2 and 3, reported in previous examples.

Figure 7:
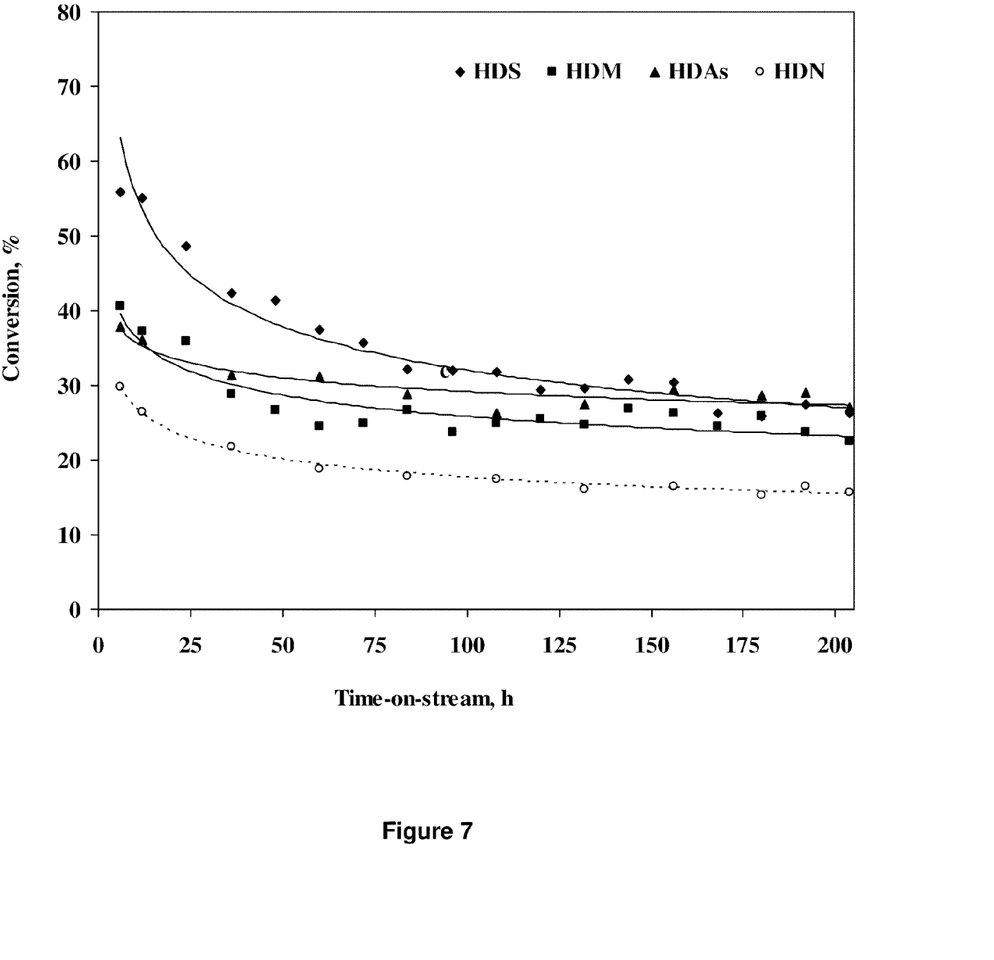
FIG. 7 shows the heavy crude oil hydroprocessing activities for a typical NiW/$Al_2O_3$-USY zeolite (ZeoAl) mixed oxide supported catalyst of the present invention prepared by DM method and tested with a feedstock (API gravity=21.3, S=3.5 wt. %, Ni+V=322 wppm) as function of time-on-stream (Catalyst 4).

FIG. 7 shows the hydroprocessing activities of heavy crude oil for the catalyst of the present invention supported on mixed oxides NiW/Al$_2$O$_3$-zeolite USY (ZeoAl) with a heavy crude feedstock (API gravity=21.3, S=3.5 weight %, Ni+V=322 ppm in weight), as a function of time-on-stream (catalyst 4). The initial activity of this catalyst is high for HDS, HDM and HDAs, but the deactivation of this catalyst with time-on-stream was slightly faster, which may correspond to the acidity of the catalyst.

Example 5

Catalyst 5, a CoMo catalyst containing silica-alumina of the invention, was prepared using a procedure similar to Catalyst 3. The metal content of the catalyst 5 of this invention is 2.0 weight % of Co and 6.5 weight % of Mo, which was studied using a procedure shown in FIG. 2 for the preparation of the extrudates. The textural properties of the catalyst (Cat-5) are shown in Table 1 where it is observed that the catalyst contains meso- and macro-pores.

Catalyst 5 of this invention was evaluated and its process conditions and feed properties are similar than those of catalysts 1, 2, 3 and 4 reported in previous examples.

Figure 8:
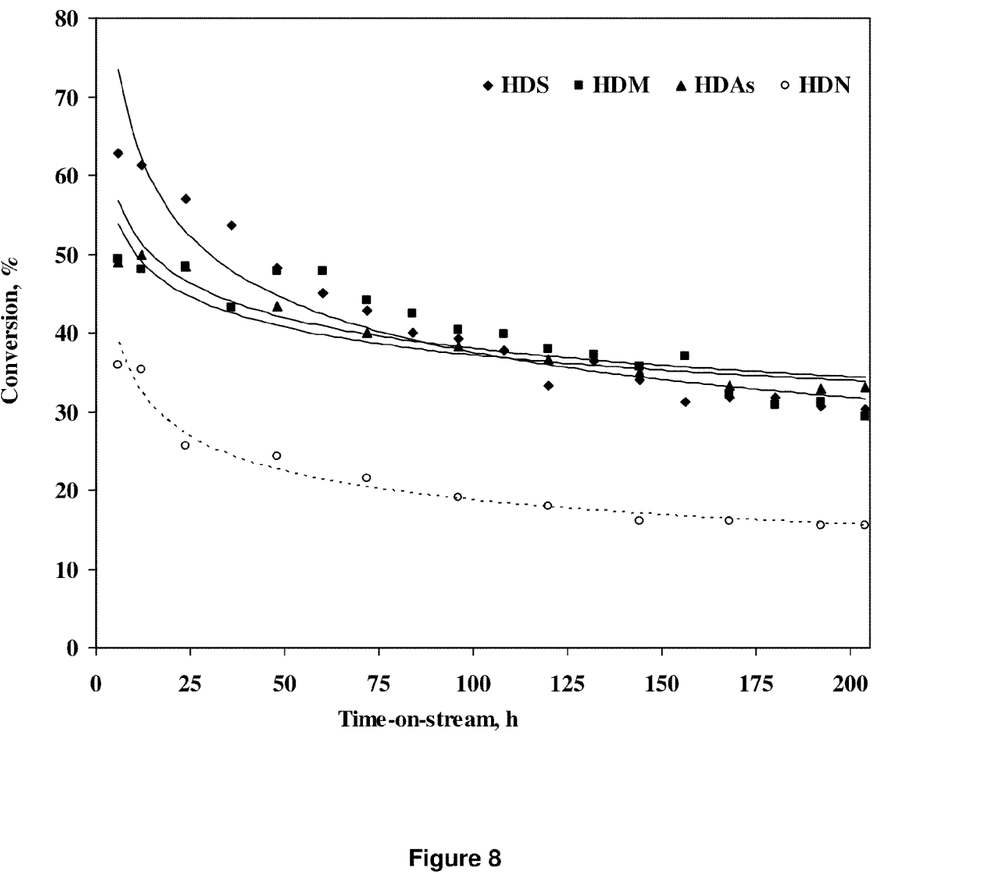
FIG. 8 shows the heavy crude oil hydroprocessing activities for a typical CoMo/$Al_2O_3$-USY zeolite (ZeoAl) mixed oxide supported catalyst of the present invention prepared by DM method and tested with a feedstock (API gravity=21.3, S=3.5 wt. %, Ni+V=322 wppm) as function of time-on-stream (Catalyst 5).

FIG. 8 shows the hydroprocessing activities of heavy crude oil for the catalyst of the present invention supported on mixed oxides CoMo/Al$_2$O$_3$-zeolite USY (ZeoAl) with a heavy crude feedstock (API gravity=21.3, S=3.5 weight %, Ni+V=322 ppm in weight), as a function of time-on-stream (catalyst 5). The initial activity of this catalyst is high for HDS, HDM and HDAs, but the deactivation of this catalyst with time-on-stream was slightly faster, which also may correspond to the acidity of the catalyst.

Example 6

Comparison of Catalysts

Figure 9:
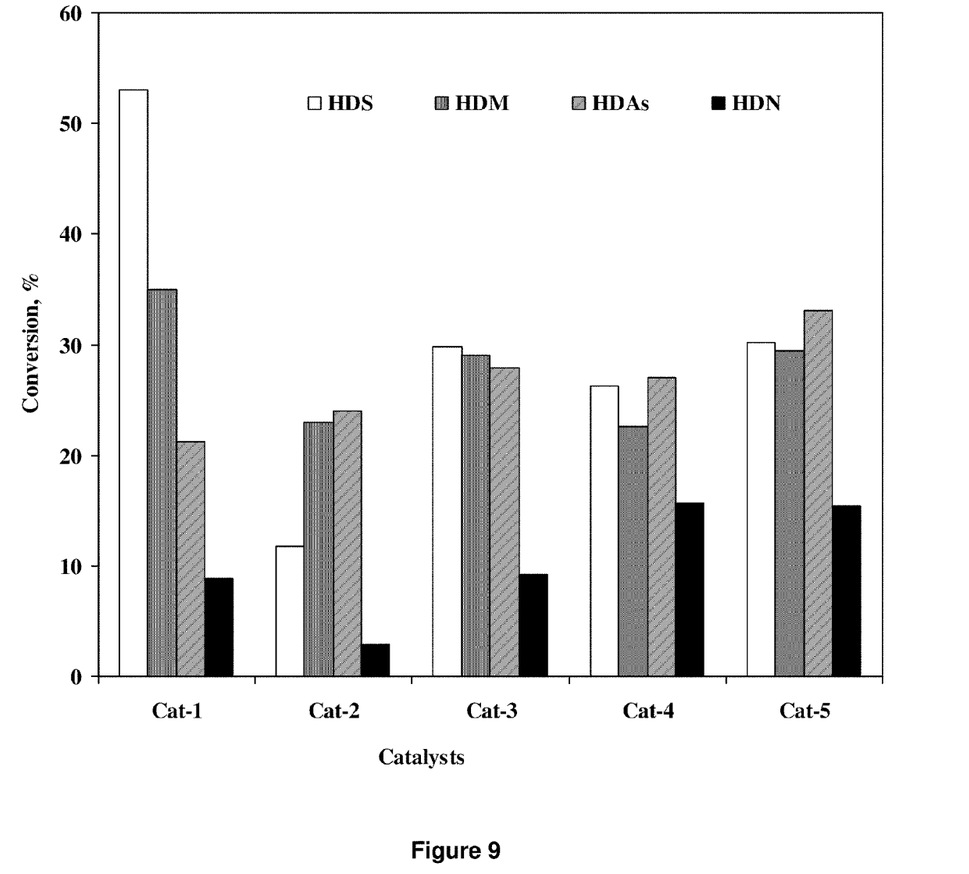
FIG. 9 shows the comparison of performance for different catalysts of the present invention for heavy crude oil (API gravity=21.3, S=3.5 wt. %, Ni+V=322 wppm) conversion after 204 h time-on-stream.
Figure 10:
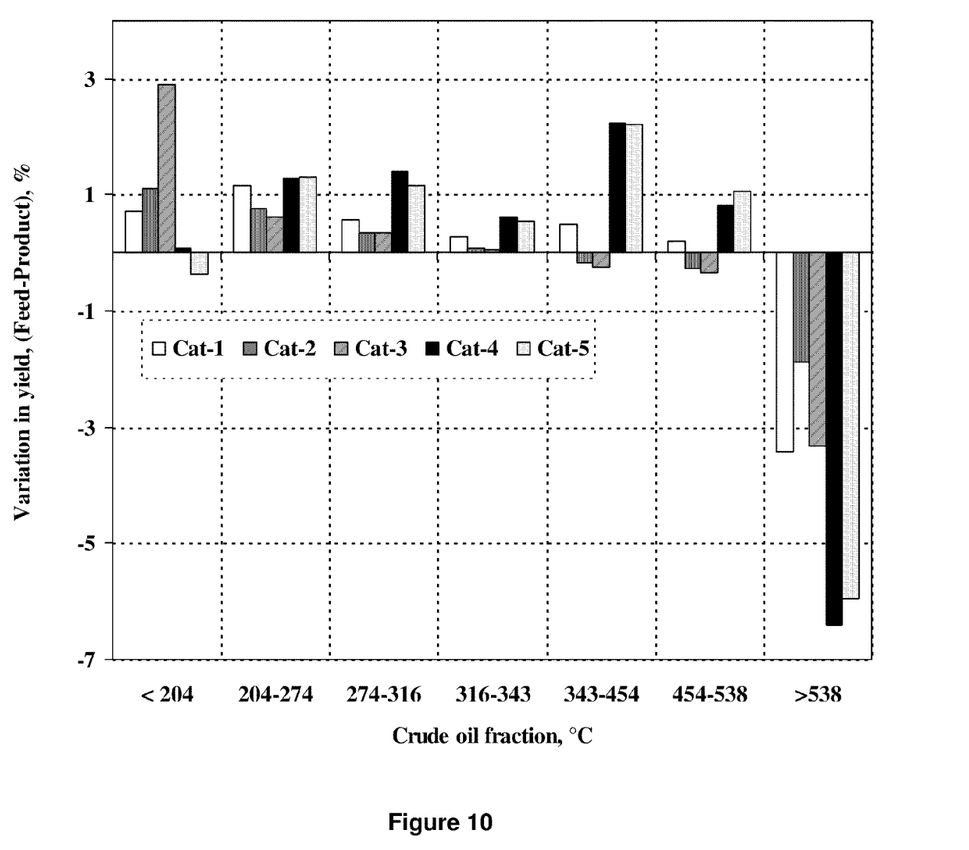
FIG. 10 shows the comparison between various catalysts of the present invention for liquid product yield after 204 h time-on-stream.

Activities of Cat-1 to Cat-5 were compared for the steady-state conversion (204 hours time-on-stream) of heavy crude oil (API gravity=21.3, S=3.5 weight %, and Ni+V=322 wppm) as shown in FIG. 9. The activity is correlated with the pore diameter and with the balance between pore diameter and dispersion of active catalytic sites. The comparison is also made for the product yields along with the variation of catalyst composition as shown in FIG. 10.

The present invention is related to a catalyst used principally for hydrocracking of heavy crude oil and residua. The best catalyst of the present invention comprises high selectivity to gasoline (yield). The present invention provides two catalysts, where Cat-3 showed approximately 3 times high selectivity compared with others (FIG. 10), and the other catalyst, Cat-1, has moderate selectivity for hydrocracking however, shows good conversion of HDS, HDM and HDAs (FIGS. 4 and 9) and stability with time-on-stream (TOS).

The zeolite catalyst (Cat-3) has acidic sites, which promotes hydrocracking of heavy molecules; however, it is deactivated slightly faster than Cat-1. On the contrary, SiO$_2$—Al$_2$O$_3$ catalyst (Cat-1) has a moderate acidic site that shows better stability with TOS (FIG. 4).

What we are claiming in this invention is:

1. A catalyst having moderate acidity and a large pore diameter for hydroprocessing of heavy crude oil and residua, said catalyst having a two-component support of
   (a) amorphous silica-alumina containing approximately 5 to 50 weight percent SiO$_2$ and having a Si/Al ratio of 0.2 to 1.25, the amorphous silica-alumina having a pore volume of 0.176 cc$^3$/g or higher for pore diameters of more than 140 Å or
   (b) USY zeolite in a matrix of peptized boehmite and having a specific surface area of 140 to 200 m$^2$/g, a total pore volume of 0.3 to 0.5 cm$^3$/g and an average pore diameter of 4.0 to 13 nm,
   said catalyst comprising active metal components from group VIB and group VIII.

2. The catalyst of claim 1, wherein the support consists of an amorphous silica-alumina containing approximately 5 to 50 weight percent SiO$_2$ and having a Si/Al ratio of 0.2 to 1.25, the amorphous silica-alumina having a pore volume of 0.176 cc$^3$/g or higher for pore diameters of more than 140 Å.

3. The catalyst of claim 1, wherein the support consists of zeolite in a matrix of different peptized boehmite.

4. The catalyst of claim 2, wherein the amorphous silica-alumina has a pore volume of 0.176 to 0.396 cc$^3$/g for pore diameters more than 140 Å.

5. A catalyst according to claim 3, wherein the zeolite is a USY zeolite, and the metal components are Mo or W from Group VIB and Co or Ni from Group VIIIB.

6. A catalyst according to claim 2, wherein said silica-alumina support is characterized by the textural properties: specific surface area (SSA) of 140 to 260 m$^2$/g, total pore volume (PV) of 0.4 to 0.8 cm$^3$/g, and average of pore diameter (APD) of 7.0 to 16.0.

7. A catalyst according to claim 2, wherein the concentration of active metals is of 4-9 weight % of molybdenum and 1-3 weight % of nickel or cobalt.

8. The catalyst according to claim 2, wherein said active metal components are Mo or W from Group VIB and Co or Ni from Group VIIIB.

9. The catalyst according to claim 8, wherein said silica-alumina support is characterized by the textural properties: specific surface area (SSA) of 140 to 260 m$^2$/g, total pore volume (PV) of 0.4 to 0.8 cm$^3$/g, and average of pore diameter (APD) of 7.0 to 16.0.

10. A method for the preparation of a hydroprocessing catalyst which comprises: a) preparation of a zeolite-alumina support by a dry mixing step consisting of dry mixing zeolite with different boehmites to obtain a dry mixture consisting of zeolite and alumina; b) adding water and nitric acid to peptize said boehmites and form a homogeneous paste; c) extruding the homogeneous paste into extrudates having a cylindrical shape; d) drying the extrudates; e) calcining the dried extrudates; f) incorporating metallic components of group VIB and group VIIIB into the dried extrudates using the aqueous incipient wetness impregnation method; g) drying the impregnated extrudates; and h) calcining the catalyst.

11. The method according to claim 10, wherein the support consists of a Y zeolite or a USY zeolite and alumina and said group VIB metallic component is molybdenum or tungsten and said group VIII metallic component is nickel or cobalt.

12. The method of claim 10, wherein metallic components of group VIB and group VIIIB are incorporated into the dried extrudates by using nickel nitrate and ammonia meta-tungstate in the aqueous incipient wetness impregnation method.

13. A method for the preparation of a hydroprocessing catalyst for processing heavy crudes and residua, which comprises preparing a support consisting of $SiO_2$—$Al_2O_3$ by homogeneous precipitation of $SiO_2$—$Al_2O_3$ which comprises: a) mixing aqueous solutions of sodium silicate solution (2-5 molar $SiO_2$) and aluminum nitrate (2-5 molar $Al_2O_3$) by vigorous stirring to form an acidified gel solution; b) adding an aluminum solution in the presence of a basic precipitant to the acidified solution to form a gel and increase pH above 3 for co-gelation of silica and alumina species at a constant pH of 4 to 8; c) adding a sufficient quantity of precipitant at the end of the co-gelation to obtain a final pH of the solution in the range of 8 to 9 and complete the reaction and form a solid co-gel mass; d) aging the solid co-gel mass at a temperature in the range of 60 to 80° C. to convert the co-gel mass into a sol; e) filtering the solid mass of silica-alumina (sol-gel) from the mother liquor; f) washing the solid mass with water to remove sodium ions from the co-gel; g) processing the sol using wet extrusion method to form extrudates; h) drying the extrudates; i) calcining the extrudates to form a support consisting of two-component silica-alumina; j) impregnation of the silica-alumina support with an active metal with the incipient wetness method using a group VIB metal in a first step and a group VIIIB in a second step to form an impregnated silica-alumina catalyst; k) drying the impregnated silica-alumina catalyst to form a dried impregnated silica-alumina catalyst; and l) calcining the dried impregnated silica-alumina, wherein said support is an amorphous silica-alumina having approximately 5 to 50 weight percent $SiO_2$ and a Si/Al ratio of 0.2 to 1.25.

14. The method of claim 13, wherein the co-gel is aged for approximately 15 hours; said extrudates are dried 120° C. and calcined at 550° C. for 5 hours; and said drying of said catalysts is conducted at room temperature, and then at 120° C. for 12 hours; and finally calcined 450° C. for 4 hours.

15. A method for the hydroprocessing of a heavy crude or residua feedstock, which comprises contacting said feedstock with a catalyst having moderate acidity having a two-component support consisting of
   (a) amorphous silica-alumina having approximately 5 to 50 weight percent $SiO_2$ and having a Si/Al ratio of 0.2 to 1.25, or
   (b) USY zeolite in a matrix of peptized boehmite and having a specific surface area of 140 to 200 m$^2$/g, a total pore volume of 0.3 to 0.5 cm$^3$/g and an average pore diameter of 4.0 to 13 nm,
   and comprising active metal components from group VIB and group VIII, which method comprises contacting the heavy crude or residua feedstock with the catalyst at a temperature of 320 to 450° C., a partial hydrogen pressure from 4 to 15 MPa, and a LHSV of 0.2 to 3 h$^{-1}$.

16. The method according to claim 15, wherein the hydroprocessing of said feedstock results in hydrodemetallization of 25 to 60%, hydrodesulfurization of 20 to 70 weight %, hydrocracking of 20 to 40 weight %, and hydrodenitrogenation of 25 to 5 weight %.

17. A method for the preparation of a hydroprocessing catalyst which comprises: a) preparation of a zeolite-alumina support by a dry mixing step a) which consists of mechanically mixing boehmites and USY zeolite; b) adding nitric acid and distilled water to peptize said alumina and form a homogeneous paste; b) extruding the paste to obtain extrudates having a cylindrical shape; c) drying the extrudate at 100-120° C. for 12-15 hours; d) calcining of the dried extrudates at 500-550° C. with excess air to obtain a gamma alumina support; e) successive impregnation of the supports, first with ammonium heptamolybdate and then with nickel nitrate; f) aging of the resulting solids for 12-18 hours at room temperature to obtain aged solids; g) drying the aged solids at 100-120° C. to obtain dried solids; h) calcining the dried solids to obtain a calcined support; i) impregnating the calcined support by sequential impregnation with a group VIB metal, followed by a group VIIIB metal to obtain a promoted catalyst; j) drying the promoted catalyst at a temperature between ambient temperature and 120° C. to obtain a dried promoted catalyst; and k) calcining the dried promoted catalyst.

18. The method of claim 17, wherein step d) is conducted for 4 hours; step e) results in a metal content of 10 wt % Mo, and 4.3 wt % of Ni; step h) calcination is conducted using a heating ramp of 2° C./min up to 120° C. and holding at this temperature for 2 hours; step i) is conducted by increasing the temperature up to 300° C. and holding for 2 hours; step j) is conducted by increasing the temperature up to 450° C. for 4 hours; and step m) is conducted by drying the catalyst at a temperature between ambient temperature and 120° C. for 12 hours; and step n) is conducted by calcining the catalyst at 450° C. for 4 hours.

\* \* \* \* \*